R. D. KING.
CAN HANDLING MECHANISM.
APPLICATION FILED NOV. 25, 1914.
1,196,700.
Patented Aug. 29, 1916.
13 SHEETS—SHEET 1.
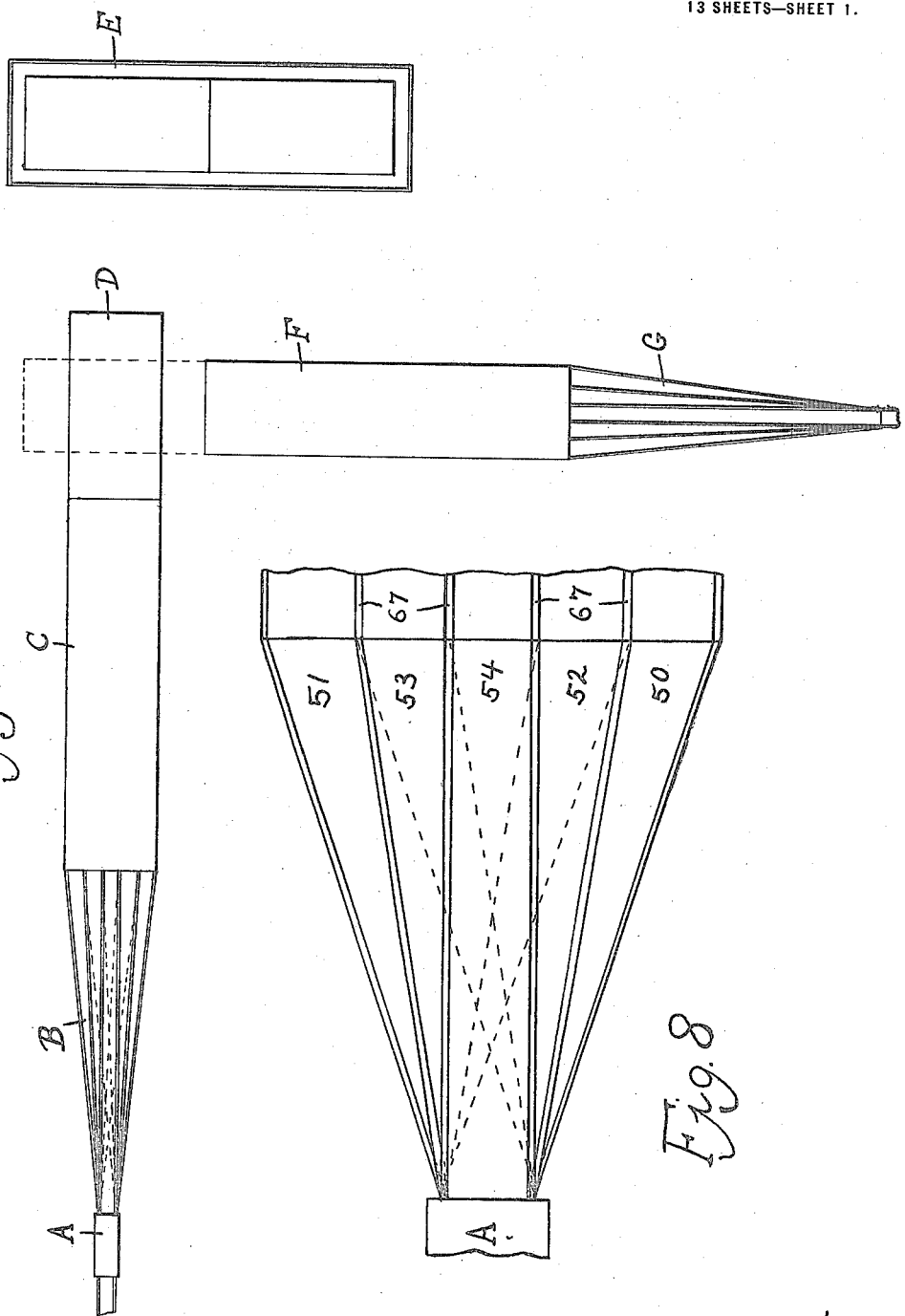

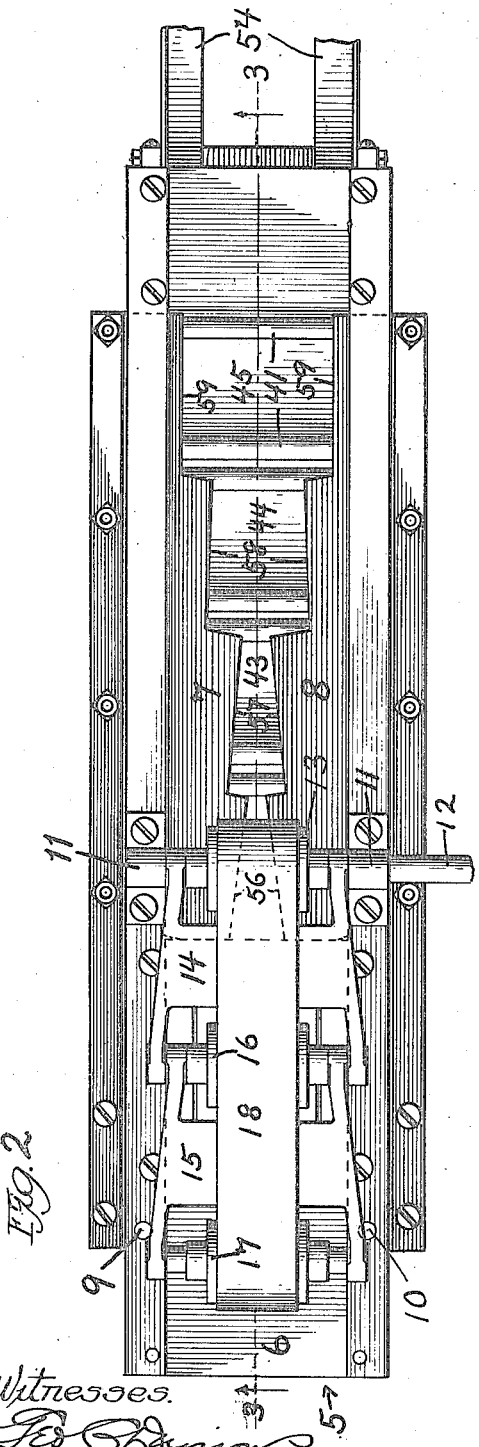
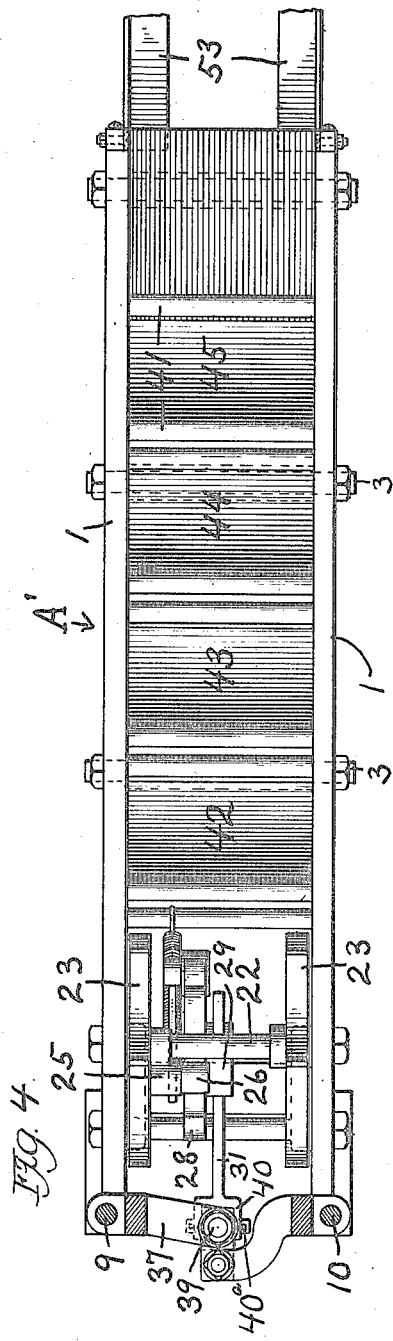

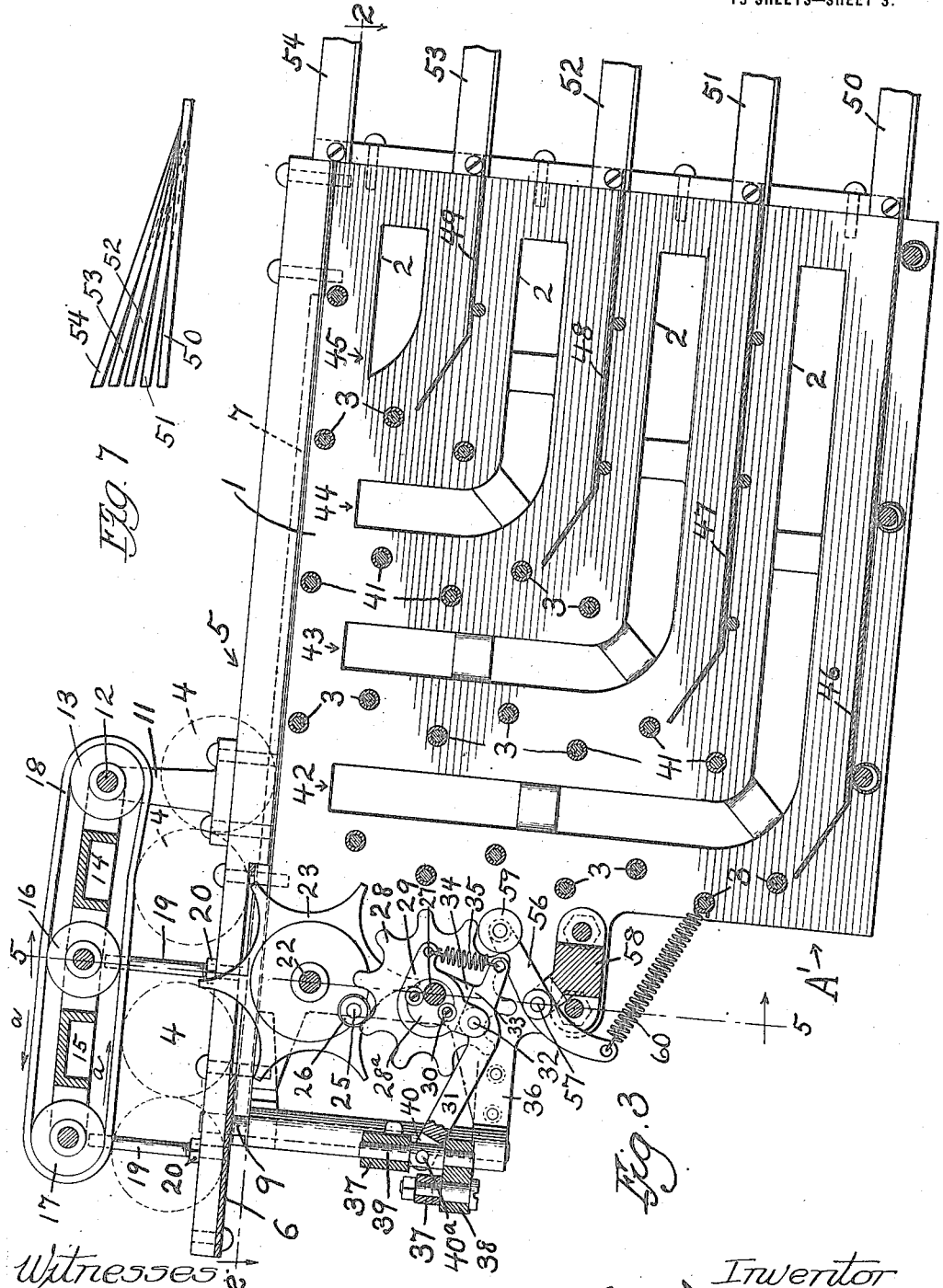

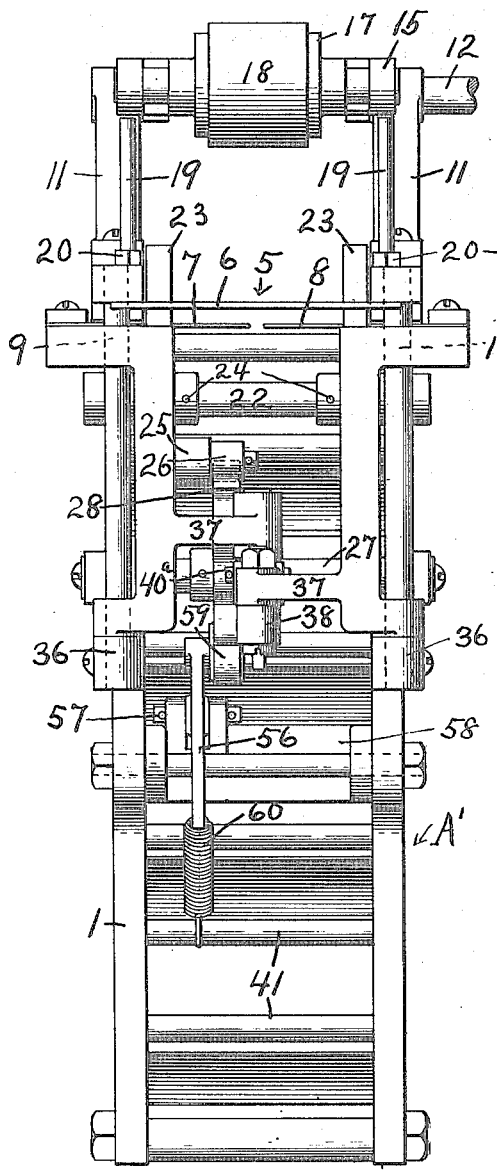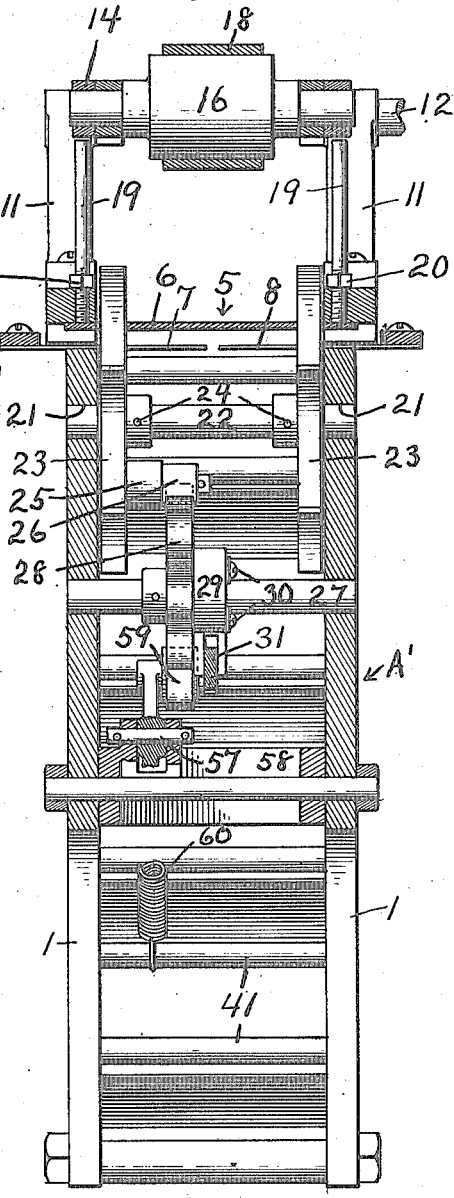

R. D. KING.
CAN HANDLING MECHANISM.
APPLICATION FILED NOV. 25, 1914.
1,196,700.
Patented Aug. 29, 1916.
13 SHEETS—SHEET 5.
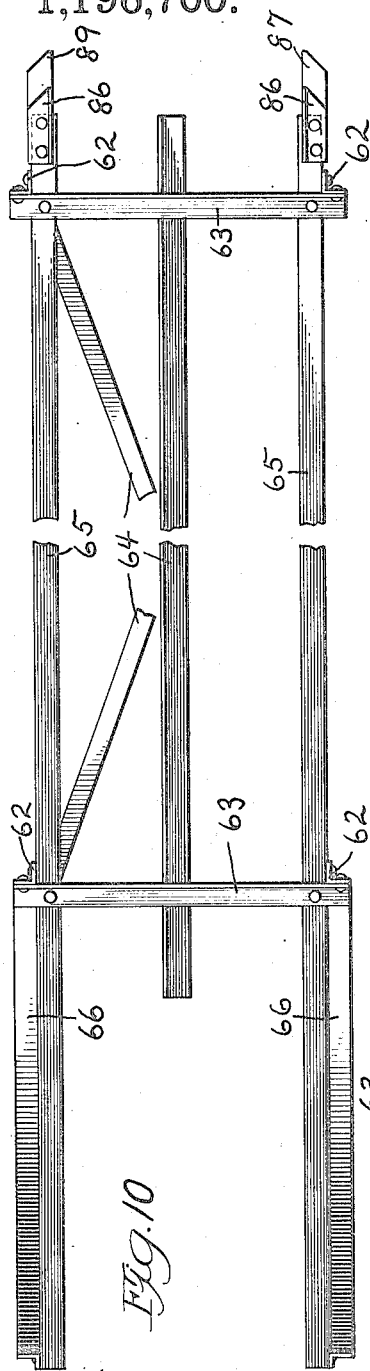
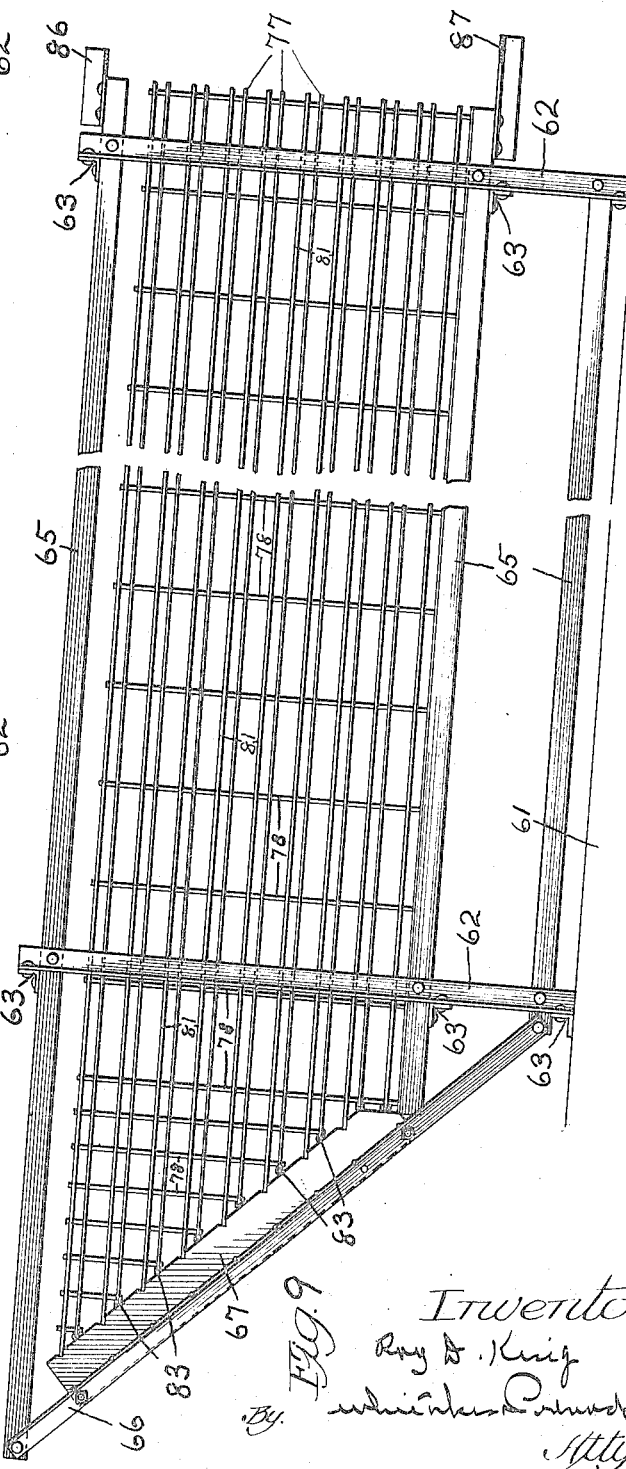

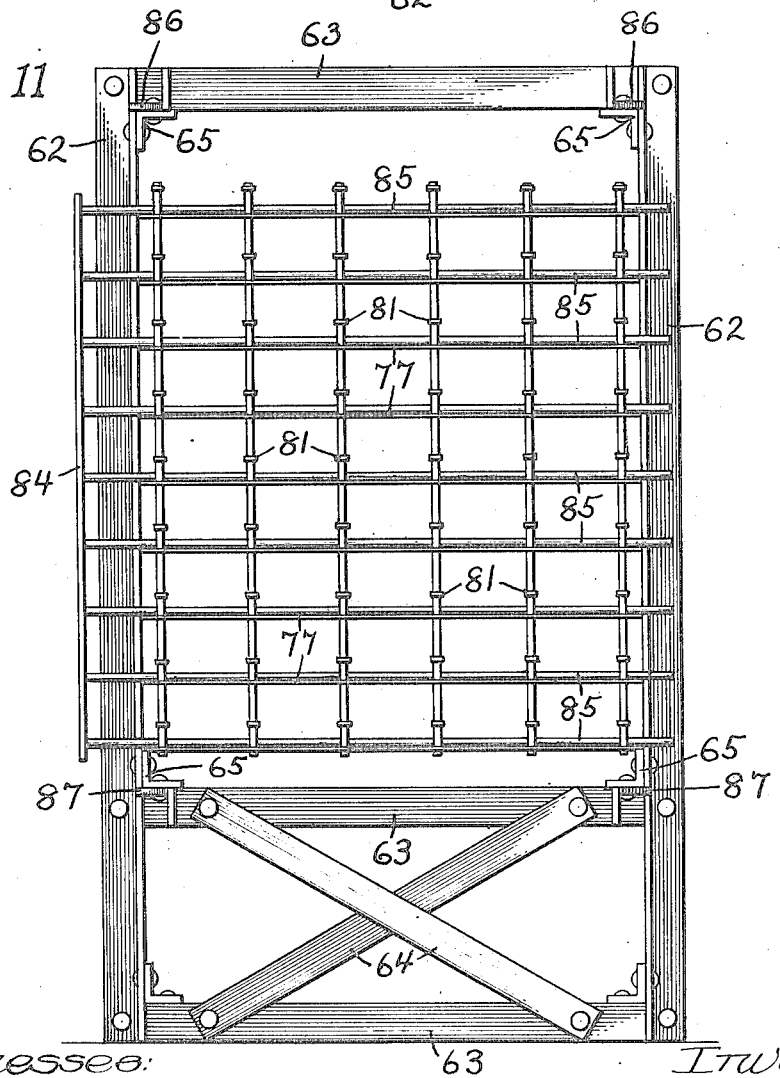

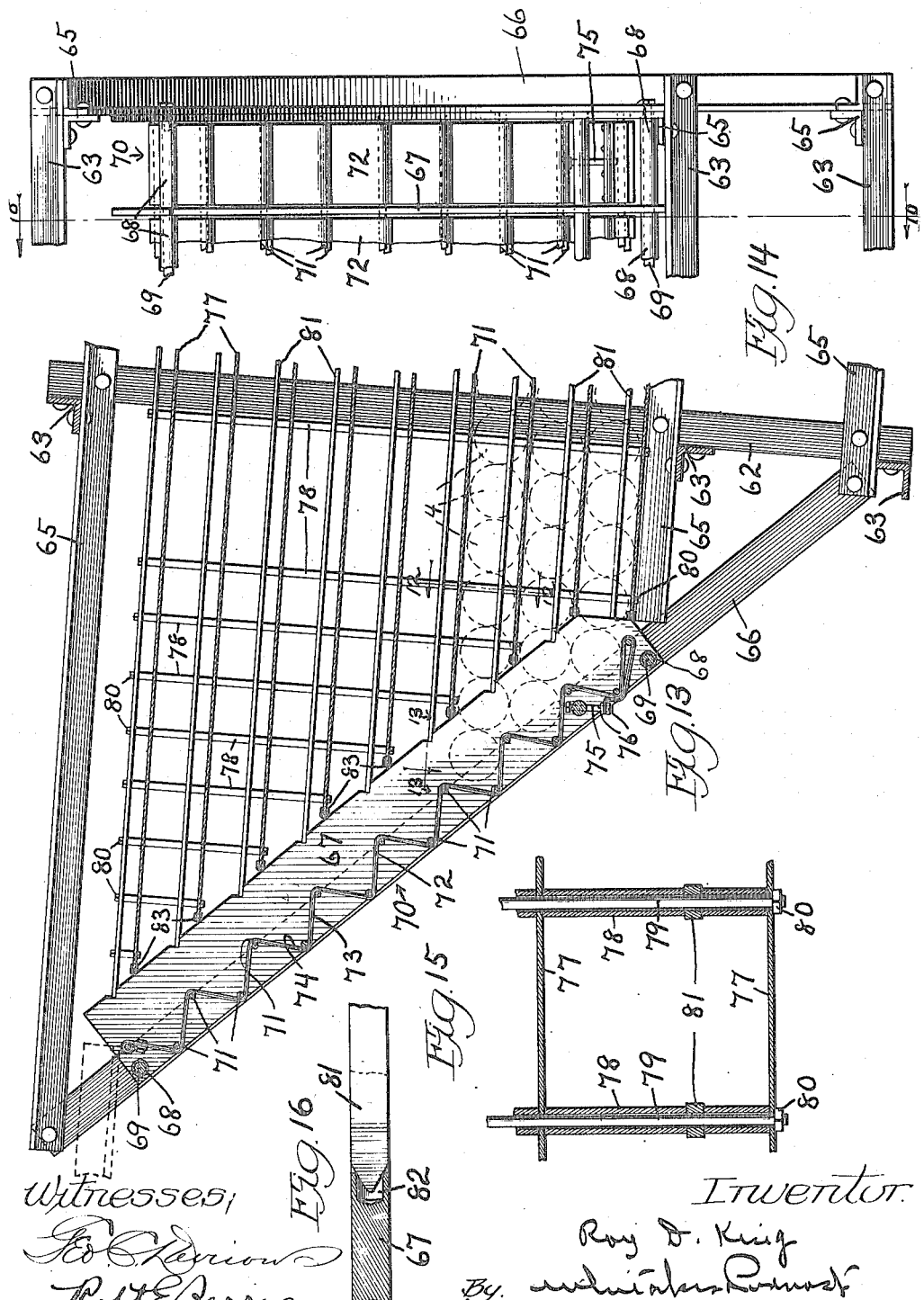

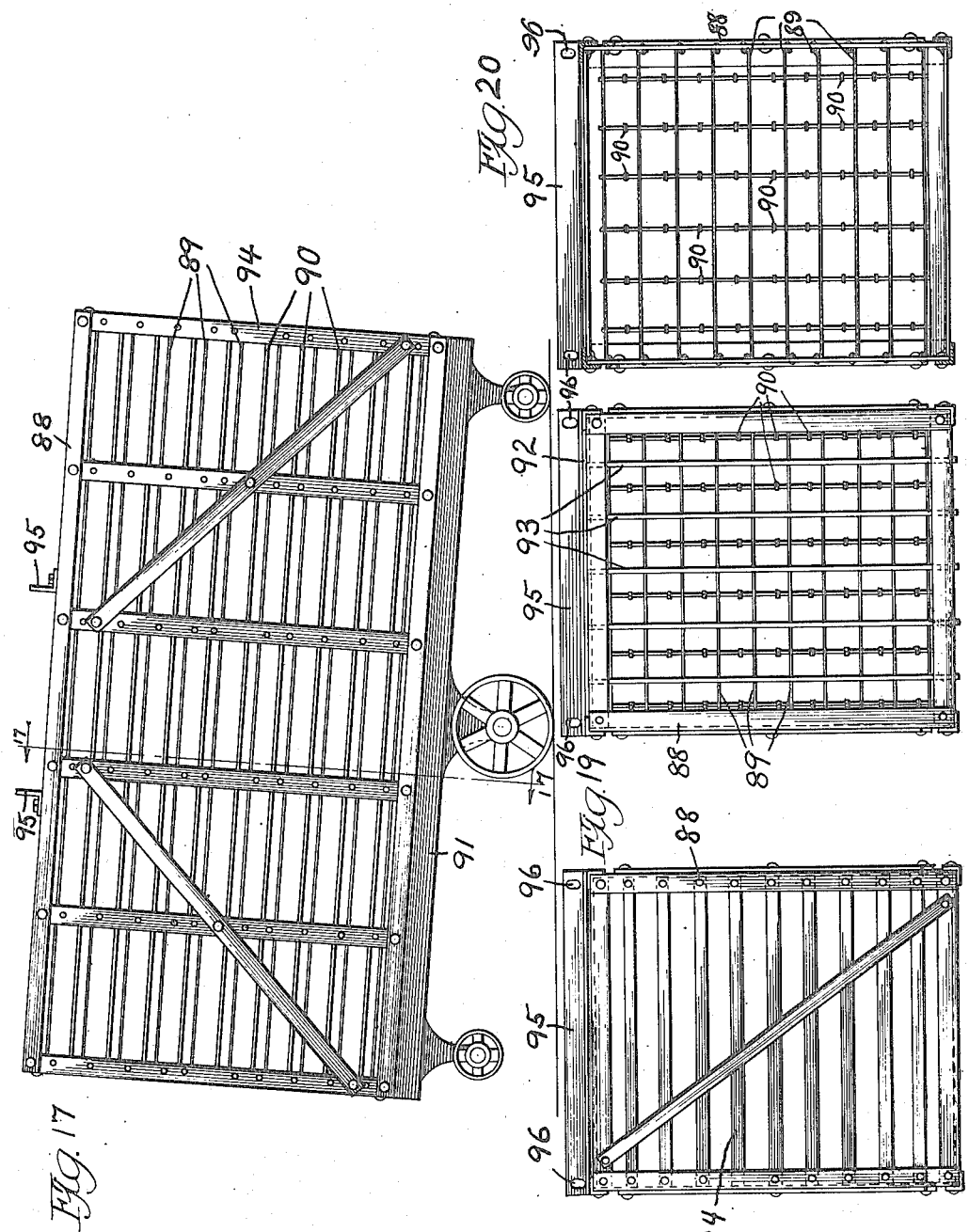

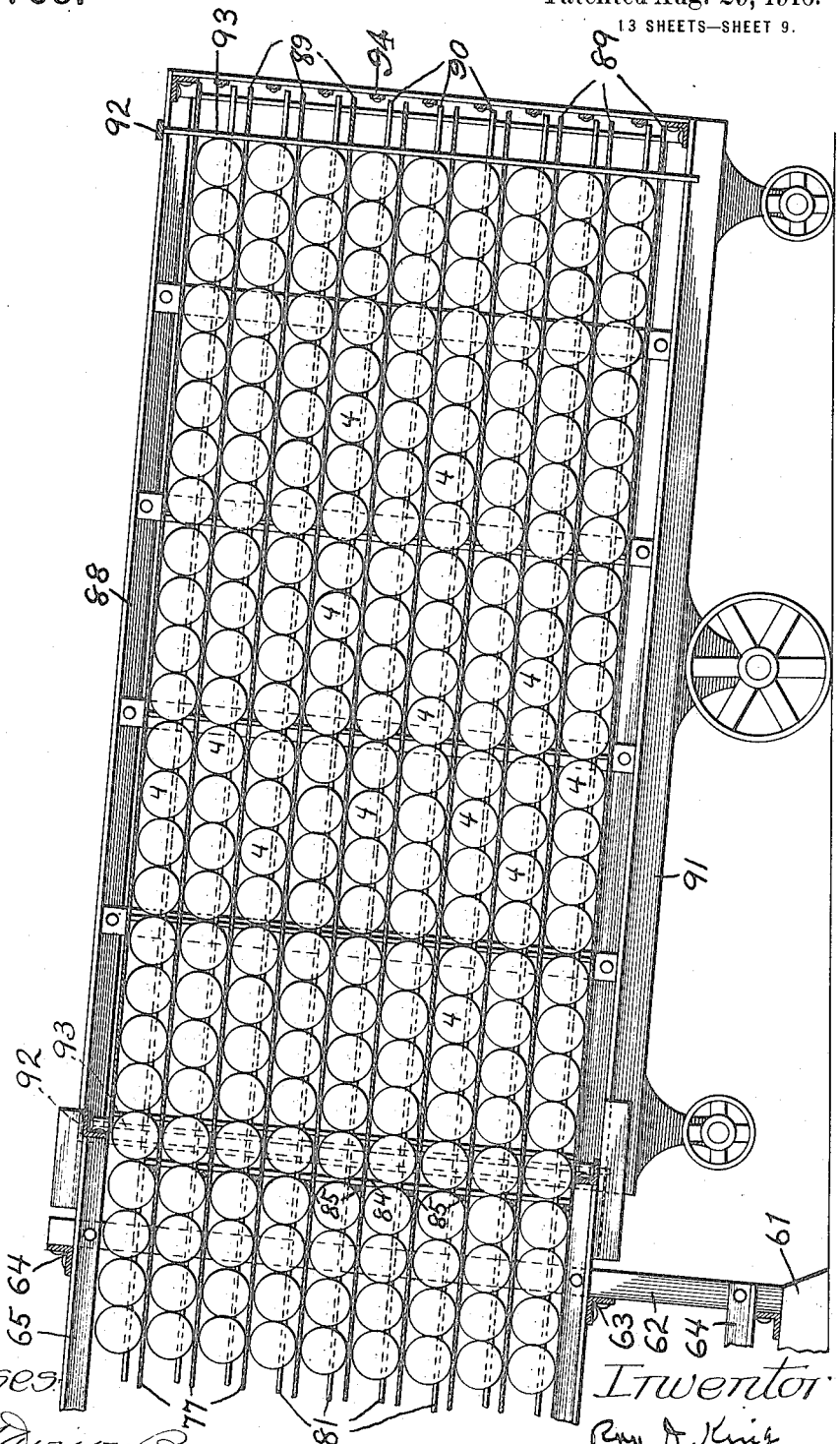

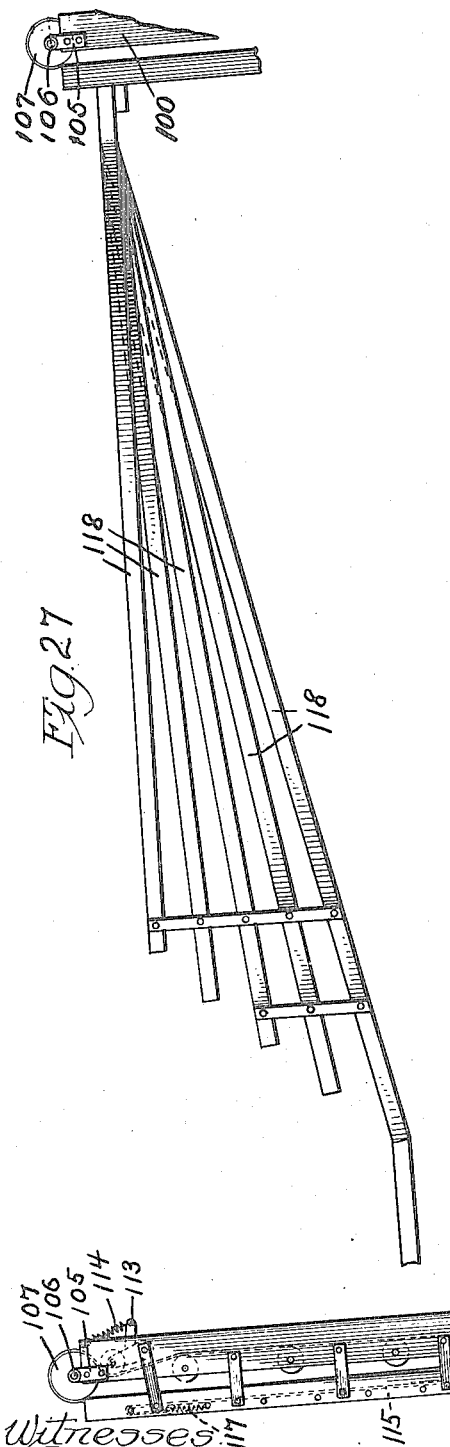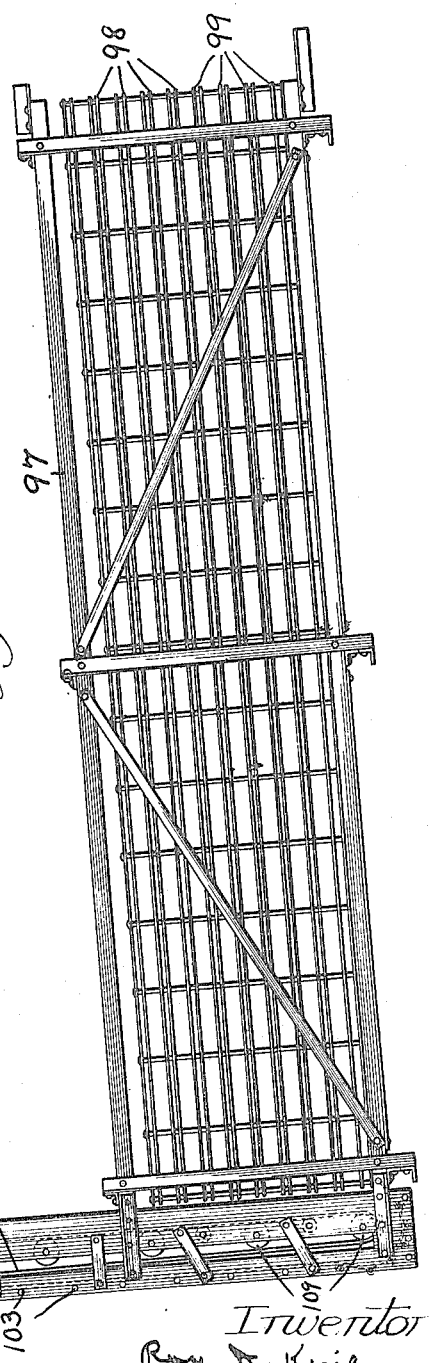

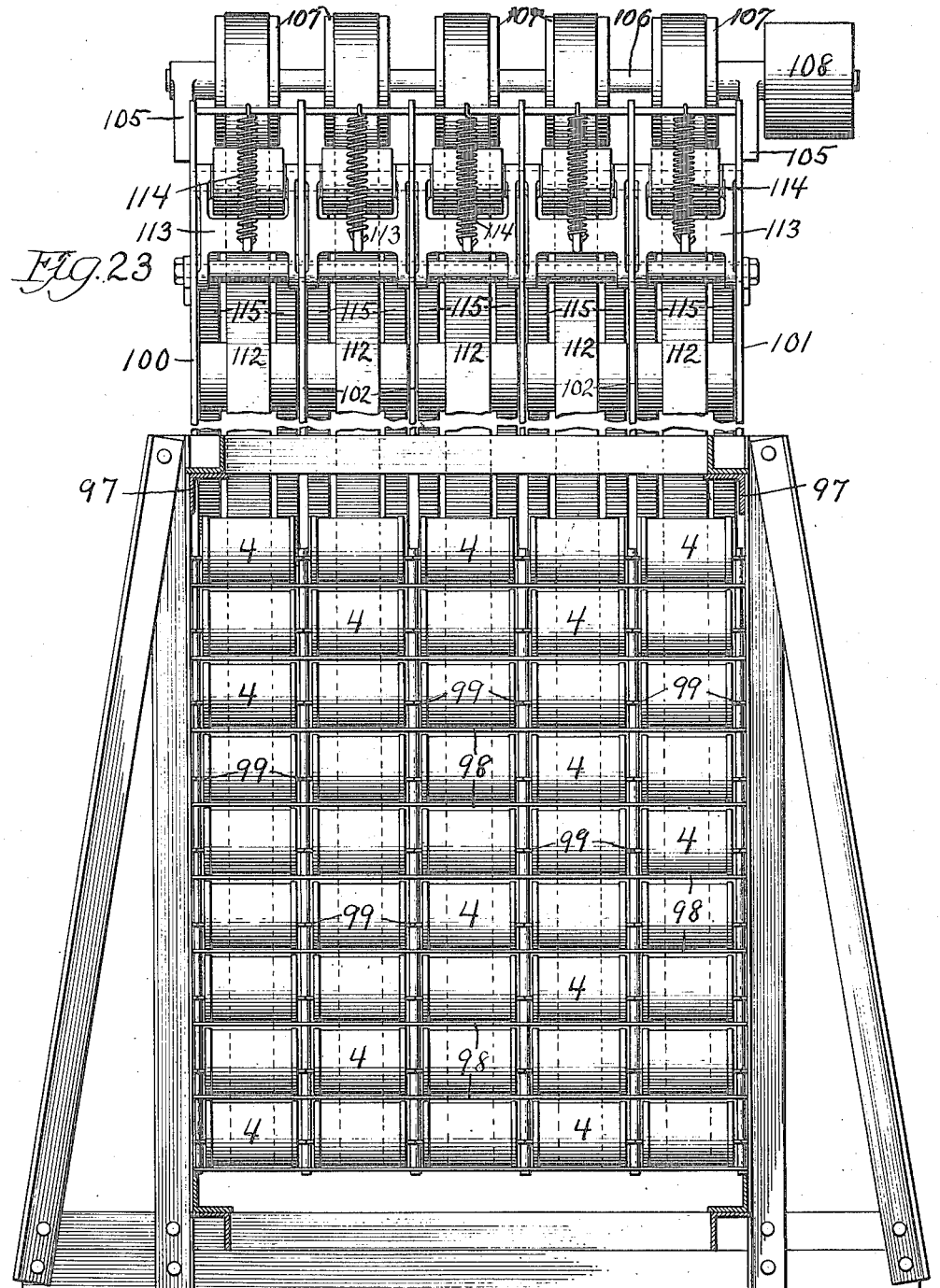

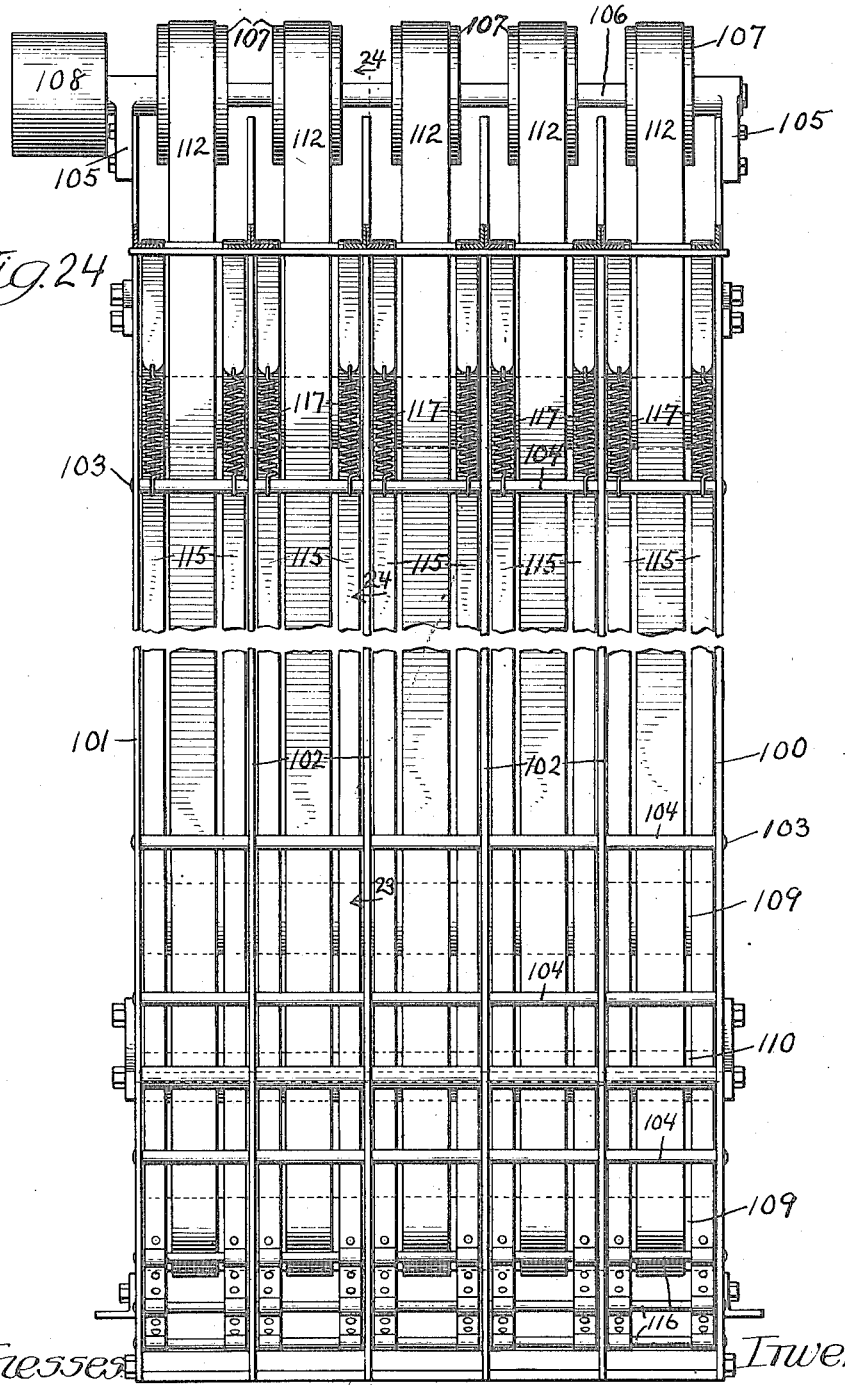

R. D. KING.
CAN HANDLING MECHANISM.
APPLICATION FILED NOV. 25, 1914.
1,196,700.
Patented Aug. 29, 1916.
13 SHEETS—SHEET 13.
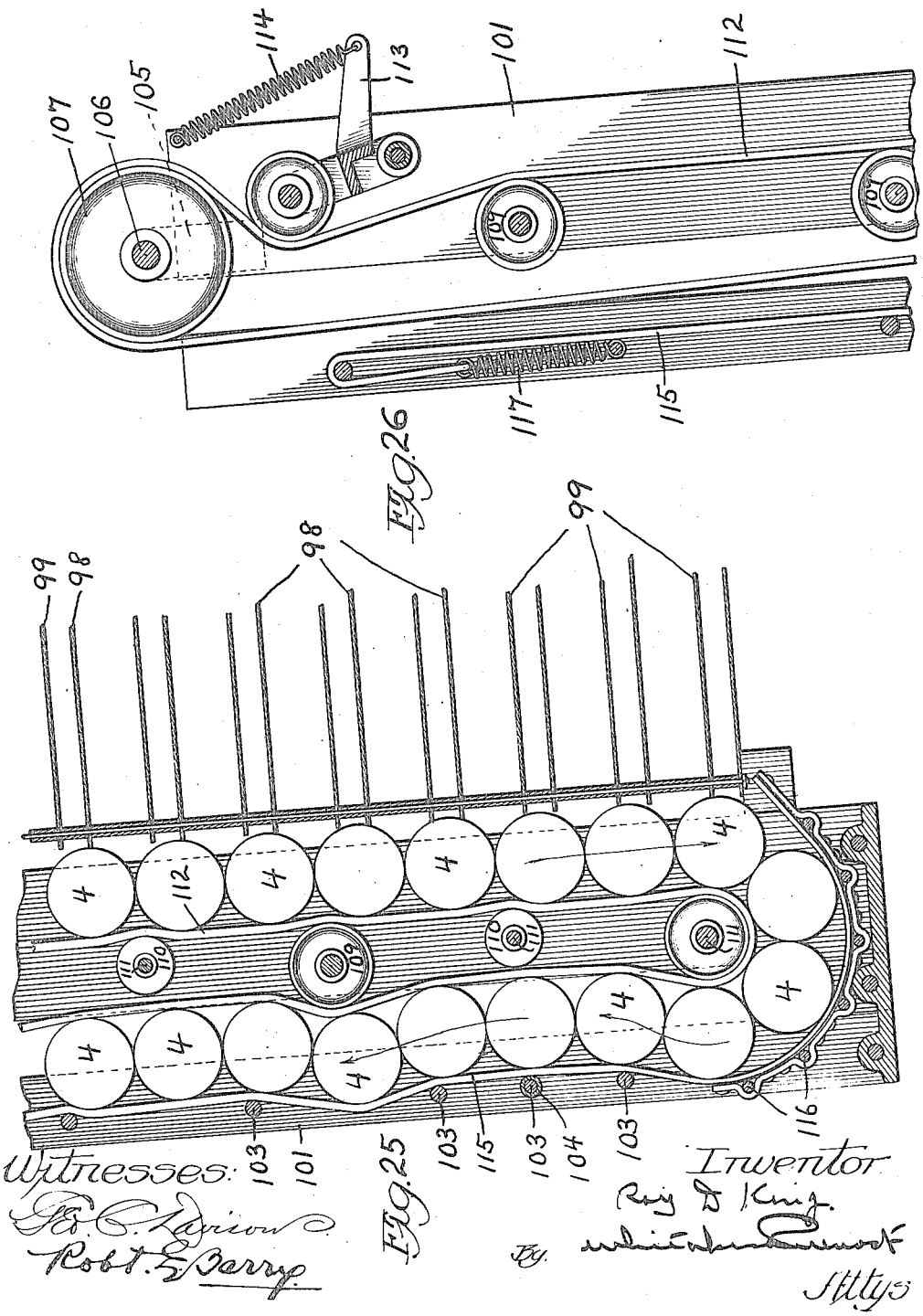

UNITED STATES PATENT OFFICE.

ROY D. KING, OF CHICAGO, ILLINOIS, ASSIGNOR TO THE JOHN WILDI EVAPORATED MILK COMPANY, OF HIGHLAND, ILLINOIS.

CAN-HANDLING MECHANISM.

1,196,700.  Specification of Letters Patent.  Patented Aug. 29, 1916.

Application filed November 25, 1914. Serial No. 874,006.

*To all whom it may concern:*

Be it known that I, ROY D. KING, citizen of the United States, residing at Chicago, in the county of Cook and State of Illinois, have invented certain new and useful Improvements in Can-Handling Mechanism; and I do hereby declare the following to be a full, clear, and exact description of the invention, such as will enable others skilled in the art to which it appertains to make and use the same.

My invention consists in the novel features hereinafter described with reference to the accompanying drawings, in which I have illustrated the same, and the said invention is fully disclosed in the following specification and claims.

Referring to the said drawings, Figure 1 is a diagrammatic view of a system for distributing, loading and unloading cans for the purpose of sterilizing the same. Fig. 2 is a top plan view of my improved distributer, designed particularly for separating a single line of cylindrical cans into a plurality of lines for the purpose of feeding the same into my improved loading device, although it may be used for other purposes where found desirable. Fig. 3 is a longitudinal vertical sectional view of the same taken on line 3—3 of Fig. 2. Fig. 4 is a longitudinal horizontal sectional view taken on line 2—2 of Fig. 3. Fig. 5 is an end view of the distributer. Fig. 6 is a transverse vertical sectional view of the same taken on line 5—5 of Fig. 3. Fig. 7 is a side elevation of the tracks which connect the distributer with the loader. Fig. 8 is a top plan view of the same. Fig. 9 is a side elevation of the loader used in connection with my improved distributer, and designed especially for separating the different lines of cans into a plurality of horizontal rows of five lines each, and for supporting said rows prior to their being loaded into a transfer basket or similar device for the purpose of conveying the cans to the sterilizer. Fig 10 is a plan view of the frame work of the loader. Fig. 11 is an end elevation of the unloading end of the loader. Fig. 12 is a fragmentary detail showing the means of connecting the transfer basket with the loader. Fig. 13 is an enlarged fragmentary longitudinal, vertical sectional view of a portion of the loader taken on line 10—10 of Fig. 13. Fig. 14 is a fragmentary front end view of Fig. 13, showing one of the cam flights. Fig. 15 is an enlarged fragmentary transverse, vertical sectional view of a portion of the loader taken on line 12—12 of Fig. 13. Fig. 16 is a fragmentary section on line 13—13 of Fig. 13, showing the means for securing one end of a guide bar to one of the separating walls between the can flights of the loader. Fig. 17 is a side elevation of the transfer basket mounted upon a tilting or rocking truck. Figs. 18 and 19 are end views of the same. Fig. 20 is a transverse vertical sectional view of the transfer basket taken on line 17—17 of Fig. 17. Fig. 21 is an enlarged longitudinal vertical sectional view, showing the transfer basket connected with and being loaded by the loader, a portion only of the loader being shown. Fig. 22 is a side elevation of the unloader, with which the transfer basket is connected, after the cans have been sterilized, and into which the cans are fed from the transfer basket by gravity. Fig. 23 is an enlarged end view. Fig. 24 is a similar view from the opposite side. Fig. 25 is an enlarged fragmentary vertical sectional view on the line 23—23 of Fig. 24. Fig. 26 is a similar view taken on line 24—24 of Fig. 24. Fig. 27 is a side elevation of the delivery tracks for bringing the five lines of cans back to a single line, shown in connection with a fragment of the upper end of the elevator of the unloader.

The object of my invention is to provide an improved device designed particularly for handling cans, and it comprises means for distributing or separating a single line of cans into a plurality of lines, means for separating each of said plurality of lines of cans into a number of horizontal rows or sections by gravity, means for loading or feeding said separated lines and rows into a receptacle by gravity, in which the cans are conveyed to and introduced into a sterilizer, means for unloading said lines and rows of cans from the receptacle by gravity, after the same have been sterilized, means for transferring said lines and rows of cans back into a plurality of lines, and gravity means for bringing the cans in the plurality of lines back to a single line. In other words, I have devised a novel system for mechanically loading a receptacle with cans, which are conveyed in said receptacle to and are introduced into a sterilizer, and after leaving the sterilizer the receptacle is mechanically unloaded. The mechanical means consists largely of gravity devices which are used for transferring the cans from one part of the device to another.

In my novel system, I employ one set of mechanism, which I will term a distributer, another which I will designate the loader, and still another which I will call the unloader.

A further object of my invention is to provide a series of mechanisms, which will be positive in their action, and which will eliminate unnecessary handling of the cans, and which may be successfully operated by unskilled labor. It is to be understood, however, that the system may be utilized for handling any kind of cylindrically shaped articles, such as barrels, jars, etc., and in other relations in which its use will be advantageous or desirable.

In carrying out my invention, I employ a distributing mechanism which mechanically separates or distributes a single line of cans into a plurality of lines of cans, from which they move by gravity into a loader which separates each of the lines into a number of different horizontal rolls. After the loader has been filled, the contents thereof are fed by gravity into the transfer receptacle. The transfer receptacle after being loaded is deposited by suitable means in a sterilizer, where the cans are sterilized. After sterilization, the transfer receptacle is removed from the sterilizer and the cans released from the receptacle and fed by gravity into the unloader, which reverses the lines and rows of cans back into a single line.

In the embodiment of my invention illustrated diagrammatically in Fig. 1, A represents the distributer which separates a single line of cans into a plurality of lines of cans, which travel down the diverging tracks B to the loader C, which separates each line into the plurality of rows in the same line. D represents the transfer basket in which the cans are conveyed from the loader C to the sterilizer E and after being sterilized the cans are conveyed to the unloader F, which reverses the plurality of lines and rows of cans back into a plurality of lines and ejects them upon the converging tracks G, which finally returns them in a single line.

In Figs. 2 to 6, I have illustrated in detail the construction of a novel form of distributer, which comprises a frame A' composed of side members 1, suitably apertured at 2 and spaced apart and connected together by rods 3.

A table 5 is mounted upon the side members 1 and consists of a stationary part 6 and a pair of movable plates or gates 7 and 8, which are pivoted at 9 and 10 to the frame and are actuated by means hereinafter described. Mounted above the table 5 in bearing brackets 11, is a shaft 12, driven by any suitable source of power (not shown) and is provided with a rigidly connected roller or pulley 13. A link 14 carrying an idle pulley 16 is pivotally connected to the shaft 12 and a similar link 15 also carrying an idler 17, is pivotally connected to link 14. An endless feed belt 18 passes around the rollers 13 and 17 and over the roller 16. The links 14 and 15 are supported at the proper height above the table by means of posts 19, which may be adjusted by nuts 20.

Freely mounted in bearings 21 in the side members 1 of the frame, beneath the table 5 is a shaft 22 which carries the star wheels 23, rigidly connected to said shaft by the pins 24. One of the star wheels 23 is provided with a stud 25, carrying a loosely mounted roller 26. Another shaft 27 is loosey mounted in the frame beneath the shaft 22 and carries a toothed disk 28 which is intermittently engaged by the roller 26 when the star wheels 23 are rotated in a manner hereinafter described.

The disk 28 is provided on one side with an integral eccentric post 28$^a$ upon which an apertured plate 29 is secured by means of screws 30. A link 31 is pivotally connected at 32 to the plate 29 and is provided with an abutment 33 which is normally maintained in engagement with a similar abutment 34 on the plate 29, by a coil spring 35.

The pivot pins 9 and 10 upon which the gates 7 and 8 are swiveled, are supported at their upper ends by the table 5 and at their lower ends by the brackets 36, which extend longitudinally from the side members 1 of the frame A.

The gates 7 and 8 are rigidly connected to arms 37 pivotally mounted upon the pins 9 and 10 and one of these arms is pivotally connected at its extremity to a link 38 that is in turn pivotally connected to the lower extremity of a double ended post 39 carried by the forked end 40 of the link 31 by a pin 40$^a$. The extremity of the other link 37 is directly connected to the upper end of the post 39.

The rods 3 which connect the two side members 1 of the frame are provided with resilient coverings 41 and are arranged in staggered relation to form a plurality of approximately vertical rows 42, 43, 44 and 45 which communicate at their lower ends respectively with horizontal shelves 46, 47, 48 and 49, and these shelves are connected with tracks 50, 51, 52 and 53. The table 5 is also connected with a track 54 and all of the tracks while being directly beneath one another at the end of the distributer, diverge into a common horizontal plane at the feeding end of the loader, as shown in Figs. 7 and 8. It will also be noted at this point that the gates 7 and 8 are provided on opposite edges with cut out portions 56, 57, 58 and 59 which allow cans passing over the table 5 to drop through the gates into the different vertical rows 42 to 45 in a manner hereinafter described.

The operation of the distributer is as follows: The cylindrical cans 4 lying upon their sides are rolled onto the stationary part 6 of the table 5 and are engaged at the gravity controlled end of the feeding device by the belt 18, which moves in the direction indicated by the arrows $a$. As the cans move forward along the table 5 they engage the star wheels 23 and cause the same to rotate and upon the star wheels completing a revolution, the roller 26 engages the toothed disk 28 and moves the same one step. As the disk 28 is moved step by step, its eccentric post $28^a$ causes the apertured plate 29 to reciprocate the link 31 and said link being connected to the arms 37 of the gates 7 and 8, causes said gates to be slowly opened to their full extent and then slowly closed.

As the machine is constructed, the first twelve cans coming from the feed belt 18 will roll by gravity over the gates 7 and 8 and onto the track 54 down which they continue to roll to the loader, hereinafter described in detail. The passage of the first twelve cans causes the star wheels 23 to make two complete revolutions and this advances the disk 28 two steps or a sufficient distance to swing the gates wide enough to allow cans to drop between the cut out portions 59 into the passage 45 and down onto the shelf 49, where they roll by gravity onto the track 53 and continue to the loader. As the cans proceed in their forward movement the star wheels cause the gates to continue to open until the eccentric $28^a$ starts to reverse the movement of the link 31, when the gates will be intermittently closed.

In order that the distributer may deliver twelve cans to each row of the loader at one complete operation of the distributer, the gates 7 and 8 will not be opened sufficiently to allow the cans to drop into the passage 45 until twelve cans have passed over the gates and continued down the track 54. The gates then intermittently admit six cans to the passage 45, six to the passage 44, six to 43 and twelve to 42. Then, as the gates close they admit six cans to passage 43, six to 44 and six to 45. This will insure an accurate feeding and loading of the loader.

When the machine is in operation and the movement of the star wheels 23 causes the toothed disk 28 to move, it is necessary to hold said disk in proper position for successive actuations, and to do this, I have provided a lever 56, pivoted at 57 to a bracket 58, which extends across the frame A and have provided said lever at its free end with a roller 59, held in engagement with the toothed disk 28 by a spring 60, which extends from the other end of said lever to one of the rods 3. If, for any reason, the cans should become lodged between the gates 7 and 8, to prevent their movement, the safety device consisting in making the plate 29 and link 31 in separate parts, held in proper relation by the spring 35, will prevent the crushing of the cans or the breaking of the machine, owing to the yielding means provided between the members 29 and 31. The simplicity of the mechanism in this step of the can handling system makes further description of it unnecessary, as its operation will be apparent to any one skilled in the art.

Having described the construction and operation of my improved distributer used in handling the cans, I will now describe my novel loader which is used in connection therewith and is illustrated in Figs. 9 to 16 of the drawings.

My improved loader comprises a frame work, which is mounted upon a slanting or inclined support 61, and consists of vertical posts 62 suitably connected by horizontally extending transverse rods 63 and braced by means of rods 64. Longitudinally extending rods 65 connect the posts 62 on either side of the frame work and the upper rods 65 extend beyond the posts at the feeding end of the loader, and the extremities of their extending portions are connected by obliquely positioned rods 66 to the lower portion of the frame work. The obliquely positioned rods 66 have provided between them five separating walls 67, which are suitably held in separated position by means of collars 68 upon rods 69, which connect the two rods 66. It will be understood, that the horizontally disposed ends of the tracks 51 to 55, which connect the distributer and the loader, are connected to the loader between the separating walls 67, whereby the cans pass between said walls into the loader in five separated rows.

Between adjacent separating walls, flights 70 for the cans are provided, and each of the flights consists of a series of staggered rods or pins 71 upon which a belt 72 is stretched in the form of steps. The belts of the different flights are preferably composed of strips of tin 73 covered with a layer of felt 74, which provides a resilient surface or cushion for the falling cans. A tension means, consisting of a stationary bolt 75 and nuts 76 is provided in each of the flights for the purpose of tightening the belts, in a well known manner.

The frame work of the loader is divided up into a number of stories by floors 77 and these stories are held the proper distance apart by means of collars 78 which are carried by vertically extending rods 79, that pass through apertures in the floors and are secured by means of nuts 80. Each of the floors 77 is divided into five passages to accommodate the separate lines of cans, by guide rods 81 which are mounted on the rods 79, as best shown in Fig. 12. The forward ends of these guide rods are pointed and engage recesses 82 provided in the separating walls 67, as shown in Fig. 16, to prevent the possibility of their becoming bent and forming an obstructed path for the cans. Buffers 83 are provided upon the forward edges of the floors 77 to prevent injury to the cans and to eliminate noise.

A stop or end gate consisting of a vertical rod 84 having a plurality of horizontally extending tines 85, as best shown in Fig. 11, prevents the cans from rolling out of the loader, but may be withdrawn when the transfer basket (hereinafter described) is to be filled. At the rear end of the loader, members 86 and 87 are provided at the top and bottom respectively of the frame work to insure ease in the alinement of the transfer basket with the loaders as hereinafter described.

The cans coming from the distributer will enter the loader by gravity and descend the stair like flights 70, passing down to the lowest series of compartments or passages, which will be completely filled before any cans can enter the passages of the floor above, and so on until all the floors 77 are filled. After all of the floors of the loader have been filled the cans may be loaded into the transfer basket, which I will now proceed to describe.

The transfer basket shown in Figs. 17 to 20 inclusive, comprises a suitable rigid frame work 88, within which are a series of floors 89, each associated with a series of guide bars 90, which separate the floors into a plurality of passages. These floors and guide bars are so constructed and arranged as to exactly register with the passages of the loader previously described. The transfer basket is detachably mounted upon a tilting truck 91, which forms no part of the present invention.

After the transfer basket has been placed in the position shown in Fig. 21, i. e. in connection with the rear end of the loader, the stop bar 84 carrying the tines 85 is removed from the loader to permit the cans to pass by gravity from the loader into the basket. A stop bar 92 carrying tines 93 previously inserted from the top of the basket, prevents the cans from entirely filling the several compartments of the basket, for a purpose about to be described. After the basket has been filled from the loader, the stops 85 are inserted in the loader to prevent more cans from being discharged, and then the stops 93 are removed. This permits the cans to roll farther into the basket until they are halted by the end 94 of the basket, and the stops 93 are then inserted in the opposite end of the basket, as shown in dotted lines in Fig. 21, to close the same.

Upon the top of the basket are two cross bars 95, having apertures 96 for the reception of a suitable hoisting appliance, not shown, and after the basket has been filled it is removed from the truck by said hoisting apparatus and placed in the sterilizer E, which forms no part of the present invention.

From the foregoing it will be seen that I have devised a novel construction of can handling machinery which separates a single line of cans into a plurality of lines of cans and then separates these lines into a plurality of horizontally separated rows, which are moved by gravity into a receptacle for conveyance to the sterilizer. The advantages of this part of my device will be apparent to those skilled in the art.

Subsequent to sterilization, the transfer basket containing the cans is removed from the sterilizer and again placed on the rocking truck 91 upon which the basket is conveyed to the unloader, which will now be described. Upon reaching the unloader the front end of the transfer basket is connected with said unloader in a manner similar to its connection with the loader.

The unloading mechanism is shown in Figs. 22 to 27 inclusive and comprises a frame work 97 inclosing a series of floors 98, each of which is separated into a plurality of passages by a series of guide bars 99, to exactly register with the corresponding compartments in the transfer basket. After the basket has been connected with the unloader the stop bar 92 is removed from the basket and the cans allowed to roll by gravity into the several associated compartments of the unloader.

The cans continue to roll down the several inclined floors until they reach the elevator, which comprises a frame having two sides 100 and 101, the space between which is divided into five sections by means of a plurality of separating walls 102 connected together and to said sides by rods 103 and spaced apart by collars 104 provided upon said rods. Bearing brackets 105 are provided upon the upper ends of the sides 100 and 101 and loosely carry a shaft 106 provided with a number of rigidly connected drive pulleys 107 and with a driving pulley 108, which is driven from any suitable source of power. Idle pulleys 109 and 110 are loosely mounted upon shafts 111, which extend transversely of the frame in staggered relation and a series of belts 112 pass around the drive pulleys 107 and over the idle pulleys 109 and 110. A suitable belt tightening device 113 controlled by springs 114 is provided for maintaining the proper tension on said belts.

A series of tensioning belts 115 are secured upon rods 116 at the bottom of the elevator and from there pass inside of the rods 103 which maintain the belts 115 at a proper distance from the belts 112 to cause a gripping action on the cans at all points between the belts, thus obviating the possibility of the last can in the elevator becoming lodged in the shaft.

The necessary tension in the tension belts is obtained by a series of springs 117 passing from the upper ends of said belts to one of the rods 103. It will be seen by referring to Fig. 25, that the distance between the ends of the floors 98 and the movable belts 112 in each of the can elevators, is slightly less than the diameter of a can, whereby the cans are prevented from dropping more than one floor at a time without having their fall interrupted by the next lower floor.

The movement of the belts 112 causes the cans to pass from the passages of the unloader into the elevator and be gripped between the belts 112 and 115, which causes the cans to follow the direction indicated by the arrows in Fig. 25, whereby the rows of cans are reversed to five lines and elevated.

When the cans reach the top of the elevator they roll out therefrom onto a series of tracks 118, which converge from the unloader toward their outer ends, where they are arranged one above another for the purpose of returning the plurality of lines of cans back to a single line. To facilitate this returning operation, the upper one of the top tracks 118 is slightly shorter than the next succeeding lower track, and the next succeeding lower track is slightly shorter than the one beneath and so on, whereby each of the tracks 118 will drop its cans into the next lower track until the bottom one has been reached, and the bottom track 118 is extended to convey the cans to another department.

While I have described one form in which my invention may be embodied, I do not wish to be limited to the exact details of construction shown, as various modifications may be made therein without departing from the spirit of my invention.

What I claim and desire to secure by Letters Patent is:—

1. A can handling apparatus comprising means for separating a single line of cans into a plurality of superposed rows, and means for separating each of said rows of cans into a column formed of a plurality of superposed layers, said columns being arranged side by side.

2. A can handling apparatus comprising gravity means for separating a single line of cans into a plurality of superposed rows, and gravity means for separating each of said rows of cans into a column formed of a plurality of superposed layers of cans, said columns being arranged side by side.

3. A can handling apparatus comprising means for separating a single line of cans into a plurality of superposed rows, means for separating each of said rows of cans into a column formed of a plurality of superposed layers of cans, and means for loading said columns of cans into a receptacle.

4. A can handling apparatus comprising means for separating a single line of cans into a plurality of superposed rows, means for separating each of said rows of cans into a column formed of a plurality of superposed layers of cans, and gravity means for loading said columns of cans into a receptacle.

5. A can handling apparatus comprising gravity means for separating a single line of cans into a plurality of superposed rows, gravity means for separating each of said rows of cans into a column formed of a plurality of superposed layers of cans, said columns being arranged side by side, and gravity means for loading said columns of cans into a receptacle.

6. A can handling apparatus comprising means for separating a single line of cans into a plurality of superposed rows, means for separating each of said rows of cans into a column formed of a plurality of superposed layers, means for loading said columns into a receptacle for conveyance to a sterilizer, and means for unloading said cans from said receptacle.

7. A can handling apparatus comprising means for separating a single line of cans into a plurality of superposed rows, means for separating each of said rows of cans into a column formed of a plurality of superposed layers, means for loading said columns into a receptacle for conveyance to a sterilizer, and means for unloading said cans from said receptacle and returning the columns back into a single line of cans.

8. In a can handling apparatus, a distributing device comprising a frame, a table provided upon the upper portion of the same, a plurality of passages provided in said frame, and opening and closing means operable by the cans passing over the table for permitting cans to successively enter the different passages.

9. In a can handling apparatus, a distributer comprising a frame, a table provided upon the upper portion of the same, a plurality of passages provided in said frame beneath said table, and opening and closing gates forming a part of said table, means operable by said cans for permitting cans passing over the same to successively enter the different passages as the gates are opened and closed.

10. In a can handling apparatus, a distributer comprising a frame, a table provided upon the upper portion of the same, a plurality of passages provided in said frame beneath said table, star wheels provided in said frame and extending above said table, gates forming a part of said table for permitting cans to pass over the same, and opening and closing means connecting said star wheels and said gates, whereby the cans passing over said table will engage said star wheels and cause the gates, through the connecting means, to open and close to allow the cans to successively enter the different passages.

11. In a can handling apparatus, a distributer comprising a frame, a table provided upon the upper portion of the same, a plurality of passages provided in said frame beneath said table, gates forming a part of said table for permitting cans passing over the same to successively enter the different passages as the gates are opened and closed, means operable by said cans for opening and closing said gates, and a feeding device arranged above said table for moving the cans along said table.

12. In a can handling apparatus, a distributer comprising a frame, a table provided upon the upper portion of the same, a plurality of passages provided in said frame beneath said table, gates forming a part of said table for permitting cans passing over the same to successively enter the different passages as the gates are opened and closed, means operable by said cans for actuating said gates, and a feeding device arranged above said table for moving the cans along said table, said feeding means comprising a belt mounted upon a plurality of rollers, one of which is driven.

13. In a can handling apparatus, a distributer comprising a frame, a table provided upon the upper portion of the same, a plurality of passages provided in said frame beneath said table, gates forming a part of said table for permitting cans passing over the same to successively enter the different passages as the gates are opened and closed, means operable by said cans for actuating said gates, and a feeding device arranged above said table for moving the cans along said table, said feeding means comprising a belt mounted upon a plurality of rollers, one of which is driven, links suitably mounted above said table for supporting said rollers, and means for supporting the free end of said links.

14. In a can handling apparatus, a distributer comprising a frame, a table provided upon the upper portion of the same, a plurality of passages provided in said frame beneath said table, gates swiveled to and forming a part of said table, and means in the path of the cans and operated thereby, for opening and closing said gates, whereby the cans will be successively admitted to the different passages.

15. In a can handling apparatus, a distributer comprising a frame, a table provided upon the upper portion of the same, a plurality of passages provided in said frame beneath said table, gates swiveled to and forming a part of said table, star wheels provided in said frame and extending above said table, and opening and closing means connecting said star wheels and said gates, whereby cans passing over said table are adapted to move said star wheels and cause the gates through their connection with the star wheels, to intermittently open and close, to allow the cans to be successively admitted to the different passages.

16. In a can handling apparatus, a distributer comprising a frame, a table provided upon the upper portion of the same, passages provided in said frame beneath said table, gates provided with cut away edges registering with said passages and swiveled to and forming a part of said table, and means in the path of the cans and operated thereby for opening and closing said gates to allow cans to successively pass through the different cut away edges of the gates and enter the passages.

17. In a can handling apparatus, a distributer comprising a frame, a table mounted upon the upper end of the same, passages provided in said frame beneath said table, gates swiveled to and forming a part of said table, star wheels rotatably mounted in said frame and extending above said table, a projecting member provided upon one of said star wheels, a gear wheel rotatably mounted in said frame and adapted to be actuated by said projection at every complete revolution of the star wheels, and opening and closing means connecting said gear and said gates, whereby cans passing over said table will actuate said star wheels and through their connections with said gates cause said gates to intermittently open and close to allow the cans to successively pass through said gates and enter the different passages.

18. In a can handling apparatus, a distributer comprising a frame, a table mounted upon the upper end of the same, passages provided in said frame beneath said table, gates swiveled to and forming a part of said table, star wheels rotatably mounted in said frame and extending above said table, a projecting member provided upon one of said star wheels, a gear wheel rotatably mounted in said frame and adapted to be actuated by said projection at every complete revolution of the star wheels, and means connecting said gear and said gates, whereby cans passing over said table will actuate said star wheels and through their connection with said gates cause said gates to intermittently open and close to allow the cans to successively pass through said gates and enter the different passages, said connecting means consisting of an eccentrically operable link.

19. In a can handling apparatus, a distributer comprising a frame, a table mounted upon the upper end of the same, passages provided in said frame beneath said table, gates swiveled to and forming a part of said table, star wheels rotatably mounted in said frame and extending above said table, a projecting member provided upon one of said star wheels, a gear wheel rotatably mounted in said frame and adapted to be actuated by said projection at every complete revolution of the star wheels, and means connecting said gear and said gates, whereby cans passing over said table will actuate said star wheels and through their connections with said gates cause said gates to intermittently open and close to allow the cans to successively pass through said gates and enter the different passages, said connecting means consisting of an eccentrically operable link formed of two parts pivotally connected together, and a spring also connecting said parts for holding the same in proper relation.

20. In a can handling apparatus, a distributer comprising a frame, a table provided upon the same, a plurality of passages provided in said frame beneath said table, gates pivotally mounted on and forming a part of said table, star wheels rotatably mounted in said frame, a roller provided upon one of said star wheels, a gear wheel rotatably mounted in said frame and adapted to be intermittently operated by said roller, an eccentric post provided upon said gear, a link having one of its ends loosely mounted on said post, and arms rigidly connected to said gates and having their outer ends pivotally connected with the other end of the link.

21. In a can handling apparatus, a distributer comprising a frame, a table provided upon the same, a plurality of passages provided in said frame beneath said table, gates pivotally mounted on and forming a part of said table, star wheels rotatably mounted in said frame, a roller provided upon one of said star wheels, a gear wheel rotatably mounted in said frame and adapted to be intermittently operated by said roller, an eccentric post provided upon said gear, a link having one of its ends loosely mounted on said post, arms rigidly connected to said gates and having their outer ends pivotally connected to the other end of said link, and a spring controlled lever provided with a roller which engages said gear.

22. In a can handling apparatus, a distributer and a loader, and tracks connecting said distributer and loader, said tracks being arranged one beneath the other at the distributer ends of the tracks and diverging therefrom to a common horizontal level at the loader end of said tracks.

23. In a can handling apparatus, a transfer receptacle comprising a housing having one open end and adapted to be detachably mounted on a rocking truck, a plurality of passages provided in said housing, and a stop bar having a plurality of tines adapted to be inserted near the closed end of said housing and extend across said passages when the receptacle is being loaded, and be withdrawn and inserted across the open end of said housing when the receptacle is filled.

24. In a can handling apparatus, a plurality of elevators, each of said elevators consisting of a plurality of large and small rollers, a belt passing around said rollers and adapted to be driven by one of said rollers, and a stationary belt arranged at a sufficient distance from said movable belt to allow the cans to be elevated between said belts.

In testimony whereof I affix my signature, in the presence of two witnesses.

ROY D. KING.

Witnesses:
  GEO. C. DAVISON,
  FRANKLIN M. WARDEN.